ADAPTIVE EQUALIZER FOR DIGITAL TRANSMISSION SYSTEMS HAVING MEANS TO CORRELATE PRESENT ERROR COMPONENT WITH PAST, PRESENT AND FUTURE RECEIVED DATA BITS
Original Filed June 2, 1965
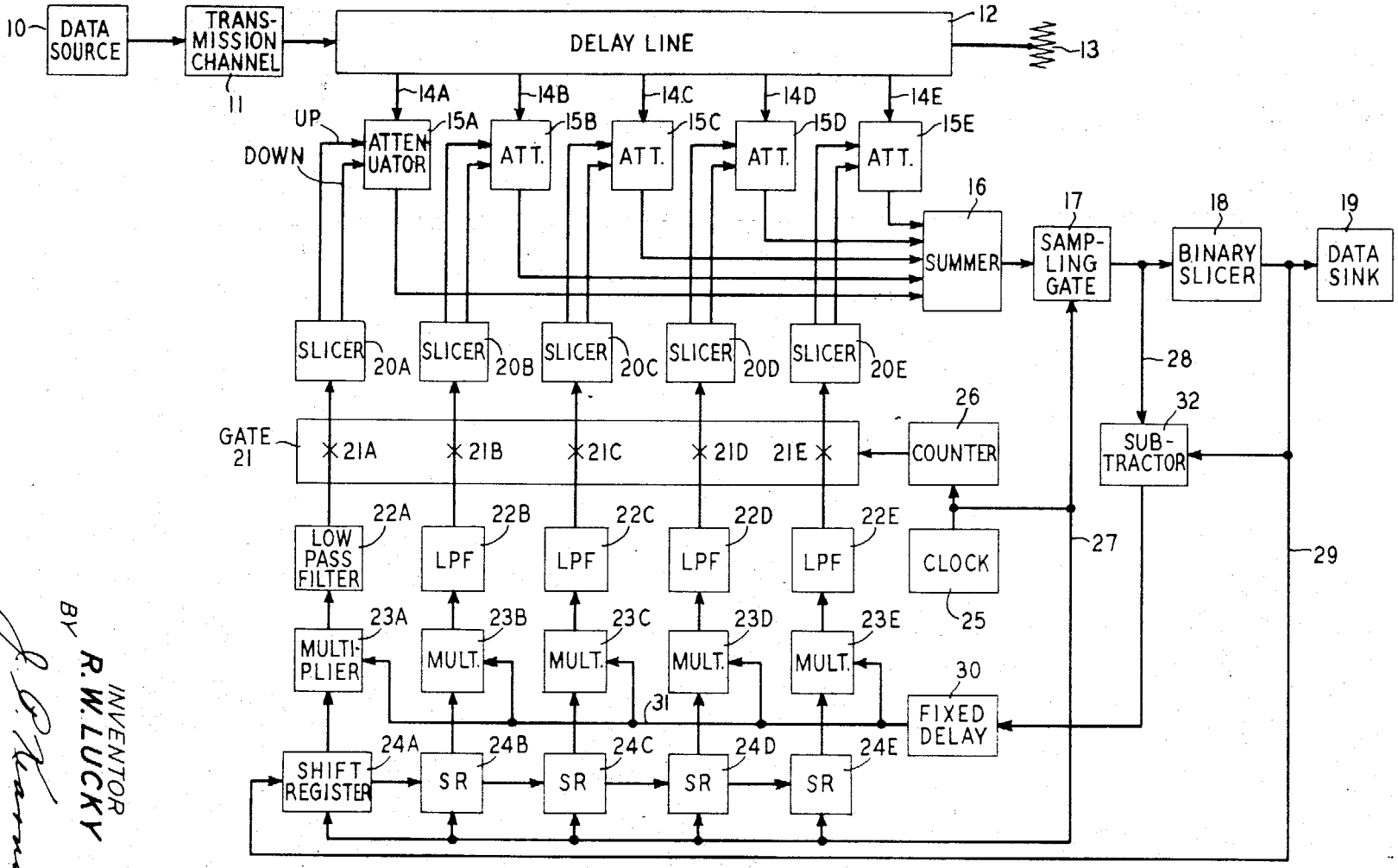
INVENTOR
R. W. LUCKY
BY
J. P. Kearns
ATTORNEY United States Patent Office Re. 27,250
Reissued Dec. 21, 1971

27,250

ADAPTIVE EQUALIZER FOR DIGITAL TRANSMISSION SYSTEMS HAVING MEANS TO CORRELATE PRESENT ERROR COMPONENT WITH PAST, PRESENT AND FUTURE RECEIVED DATA BITS

Robert W. Lucky, Fair Haven, N.J., assignor to Bell Telephone Laboratories, Incorporated, New York, N.Y.

Original No. 3,368,168, dated Feb. 6, 1968, Ser. No. 460,794, June 2, 1965. Application for reissue Sept. 18, 1969, Ser. No. 862,991

Int. Cl. H04b *3/04*

U.S. Cl. 333—18 6 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus for adaptively and continuously controlling a transversal equalizer during synchronous digital data transmission. An error signal obtained by taking the difference between the analog summation of a plurality of differentially delayed and selectively attenuated samples of a received data wave and best estimates of the sense of detected data bits is correlated with stored data estimates corresponding to past, present and future received data bits. Correlation signals averaged over an arbitrary time interval are sampled and selectively applied to equalizer tap attenuators in order to determine the individual directions of incrementation required to minimize the magnitude of the error signal.*

This invention relates to the correction of the distorting effects of transmission channels of limited frequency bandwidth on digital data intelligence signals and in particular to the rapid and continuous automatic equalization of such distorting effects adaptive to any changes in the channel characteristics with time.

In the copending joint application of F. K. Becker, R. W. Lucky and E. Port, Ser. No. 396,836, filed Sept. 16, 1964, now Patent No. 3,292,110, an automatic equalization system employing a transversal filter is described. A transversal filter is a time domain network which comprises a plurality tapped delay line, an adjustable attenuator connected to each delay line tap, and a summing circuit for combining the attenuated outputs of all taps. The adjustable attenuator described in the copending application includes a reversible electronic digital counter coupled to a resistive ladder with a large number of discrete incremental steps. During a training period preliminary to message data transmission these attenuator-counters are set to optimum values in a step-by-step procedure while test pulses are transmitted through the channel.

The algorithm for setting the attenuator multiplying factors through these counters can be simply stated. After each test pulse passes through the channel and the transversal filter, the resulting output pulse is sampled at intervals equal to the reciprocal of the data transmission rate. The multiplying factor is increased by one incremental step if the output sample is negative and decreased by one incremental step, if positive. Even with only a finite number of attenuators available for simultaneous adjustment it has been established that the resultant distortion is optimally minimized by this algorithm.

While this algorithm is basically sound, the implementation requiring a training period prior to message transmission has one inherent disadvantage. The channel characteristic, optimally equalized at the beginning of the message, may change with time. In the course of a long message such a change in channel characteristics can be significant.

It is an object of this invention to eliminate the need for sending test pulses during a pre-call set-up period for establishing the attenuator settings in an automatic transversal equalizer system.

It is another object of this invention to render an automatic transversal equalizer adaptive to changes in channel characteristics with time.

It is a further object of this invention to base the attenuator settings of an automatic transversal equalizer adaptively on measurements of the message signal itself and thereby dispense with the transmission of special test pulses.

It is a still further object of this invention to provide continuous adaptive equalization of a transmission channel during the course of normal message data transmission.

These objects and others are accomplished according to ths invention by continuously estimating from a correlation of samples of the output of the transversal equalizer with the received polar data sequence the polarities of intersymbol interference components of the single-pulse impulse response of the transmission channel and by using these polarities to determine the direction of successive incremental adjustments of the attenuators associated with the taps of the equalizer.

The intersymbol interference components of the effective impulse response of the transmission channel are estimated in the case of polar binary data transmission by sampling the analog output of the transversal equalizer at the data transmission rate, slicing these samples to detect the received data sequence, subtracting the present standardized received data symbol from the present analog output sample to determine a present error component, correlating the present error component with past, present and future received data bits within the range of the equalizer to obtain a series of product terms corresponding to successive sampling instants, and averaging a plurality of such product terms over a number of sampling intervals. The polarity of these average values are next determined by a slicing circuit. The attenuators at each tap of the equalizer are finally incrementally adjusted in opposition to such polarity determinations.

An important feature of this invention is that all equalizer components are in one location at the receiver. No answer-back detectors, switches or test pulse sources are required at the data transmitter.

Another feature is the permanent connection of the attenuator-adjusting components to the transversal equalizer.

Further objects, advantages and features of this invention will become apparent from a study of the detailed description which follows. Illustrating the various components of the invention is the single figure of the accompanying drawing which is a block diagram of the adaptive equalization system of this invention.

In the drawing elements 10 through 19 are exact counterparts of a data transmission system including a transversal equalizer as described in detail in the aforesaid Becker et al. application. Data source 10 generates polar binary synchronous message data at baseband. Through the medium of transmission channel 11 this data is transmitted either at baseband or after modulation onto a carrier frequency to a remote location and delivered at baseband after demodulation, if needed, to a utilization circuit or data sink 19. Should the attenuation characteristic of transmission channel 11 be other than flat with frequency or the phase characteristic be other than linear with frequency, then the message signals delivered to data nk 19, in the absence of equalization, will be spread out time and mutually interfering.

To obviate distortion a transversal equalizer filter is serted between transmission channel 11 and data sink ). The transversal filter comprises a delay line 12 hav- g a nonreflective termination 13 and a plurality of taps, ich as those designated 14A through 14E, equally spaced erealong at intervals corresponding to the reciprocal of e synchronous data symbol rate; a plurality of adjust- ble attenuators, such as those designated 15A through 5E, each connected at the input end to a tap on delay ne 12; and a summing circuit 16 serving as a common rmination for the outputs of all attenuators 15. Between e output of summer 16 and data sink 19 are sampling te 17 actuated at appropriate sampling times and binary cer 18 for detecting and reconstructing standardized arking and spacing data bits. Data sink 19 is any utiliza- on means for digital data such as a computer, business achine or record communication device.

The transversal filter, as is well known, operates to ualize a distorting channel by adjusting the reference p attenuator to keep the main response uniform from ulse to pulse and by adjusting the side tap attenuators to hieve a balance among and to reduce the interfering mponents to minimum values at sampling instants. Ac- rding to the principles enunciated in the aforesaid co- nding application, distortion in a transmission channel n be minimized with a transversal filter of finite length just described by detecting the polarity of samples of e outputs at each tap and advancing or retarding by in- emental amounts the attenuator settings at each tap in position thereto. All the output samples in that equal- er result from the impulse response of the transmission annel to single pulses specially applied to the transmis- on channel for test purposes. It has since been discovered at these same principles can be applied adaptively, that the equivalent single-pulse response components can estimated from the message data sequence in the nor- al course of data transmission.

A review of equalizer fundamentals is in order at this int. Data source 10 is assumed to generate a random nchronous sequence of data symbols $a_n$ at T second in- vals in accordance with the content of a message to transmitted. These are to be delivered to data sink 19. y individual $a_n$ may with equal probability be either sitive or negative. Each symbol $a_n$ would evoke in an al transmission channel a time sequences $x(t)$, where nT, and n can take on all integral values between plus d minus infinity. Only at $n=0$ does $x(t)$ have a large nzero value. At all other values of n, $x(t)=0$. There- e a sequence of data symbols $a_n$ at times nT will be ninterfering.

In passage through a practical transmission channel 11 ideal impulse response $x(t)$ is transformed into a non- al response $h(t)$ in which, in addition to the principal nzero component at $n=0$, there can be and likely are nificant nonzero components of either polarity at other lues of n. Therefore, a sequence of data symbols $a_n$ at es nT will be mutually interfering to a greater or lesser ent.

The transversal filter delay line 12 provides a practical ans for separating the principal from the interfering nponents of the impulse response $h(t)$ at its output taps A through 14E at spacings of T seconds. Attenuators A through 15E at each of taps 14A through 14E can ividually be adjusted to multiply the tap outputs by tors in the range of plus and minus one. The main nponent attenuator 15C at reference tap 14C is pref- bly adjusted to maintain the amplitude of the principal pulse response component $h_0$ uniform at all times. The er attenuators are adjusted to reduce to zero the side nponents of response $h(t)$, $n\neq 0$, within the range of number of taps on delay line 12. Only five taps are own here to avoid cluttering the drawing. The summa- n of the individual outputs of attenuators 15A through

15E in summer 16 when the principal response component is centered at tap 14C and the attenuators are optimally set will be $h_0$ plus a minimum residual component due to the finite delay line length.

In the transversal equalizer of the cited copending application the attenuator settings were made on the basis of measurements of single impulse responses $h(t)$. According to this invention these attenuator settings can also be made adaptively from measurements of the superposed impulse responses $h(t)$ in a normal message data sequence. With a succession of overlapping impulse responses $h(t)$ the overall response becomes an analog signal designated $y(t)$, where any individual sample $y_m$ is equal to the summation of the separate products of succeeding data symbols $a_{m-n}$ and the components of the single-pulse response $h_n$. For a particular case at an arbitrary second sampling time the summation becomes $$y_2=h_{-2}a_4+h_1a_3+h_0a_2+h_1a_1+h_2a_0 \qquad (1)$$

This summation is found at the output of the sampling gate 17 at the arbitrarily chosen second sampling time.

The principal and largest term in Equation 1 is the product $h_0a_2$. The remaining terms and others not written out are error components representing the total intersymbol interference at the particular sampling instant. The first requirement for determining attenuator settings is to isolate the error terms. These are generally small in comparison with the principal term. An estimate of the data symbol is obtained by slicing the output of the sampling gate 17 at each sampling instant in binary slicer 18, a threshold circuit of any well-known type. Its output is the data symbol $a_m$ which may be positive or negative. This symbol is delivered to data sink 19 and also is available on line 29.

On the assumption that the principal component $h_0$ of the impulse response remains constant from symbol to symbol and the output of slicer 18 is standardized at uniform amplitudes, the signal on line 29 is equivalent to the product $h_0a_2$ alone. The signal on line 28 is $y_2$, also containing the term $h_0a_2$ among others. Subtractor 32 with inputs connected to lines 28 and 29 has in its output therefore the error portion of Equation 1 at the second sampling instant. Subtractor 32 can conveniently comprise an inverter having its input connected to line 29 and an operational amplifier having one input connected to the inverter and the other input connected to line 28. The output of the operational amplifier is the output of the subtractor.

From the error terms in Equation 1 it can be seen that if the error terms are multiplied by $a_3$, the next succeeding data symbol, the term $h_{-1}a_3$ will have the polarity sign of $h_{-1}$ whether $a_3$ is positive or negative. Each of the remaining terms, however, has an equal chance of being positive or negative as its polarity is determined jointly by the sign of the interference component and the sign of the data symbol. It can therefore be deduced that if the products of present error and the next succeeding data symbol are taken continuously and averaged over a reasonable length of time the impulse response term $h_{-1}$ will be isolated. The remaining error terms, being random, will tend to cancel out.

Similarly, averaging the products of the present error at the output of subtractor 32 and other near data symbols will produce the other impulse response terms. The remainder of the figure shows an arrangement for taking these products and averages.

The error output of subtractor 32 is delayed in a conventional delay unit 30 by the number of sampling times between the center tap 14C of delay line 12 and the last tap 14E. For a five-tap delay line the delay required in delay unit 30 is twice that between adjacent taps on delay line 12. The purpose of delay unit 30 is to make possible effective correlation of past and future response components.

Successive data symbol estimates in the output of slicer 18 on line 29 are stored in the individual stages 24A through 24E of a conventional shift register. The contents of these stages are advanced from [right] *left* to [left] *right* under the control of advance pulses on line 27. Clock produces clock pulses on line 27 at intervals of T seconds in a conventional manner and its operation may be synchronized as necessary with transitions in the received signal wave.

If the data symbol stored in center stage 24C is considered the present symbol, then those stored in stages 24[A] *E* and 24[B] *D* are respectively the past-past and past symbols and those in stages 24[D] *B* and 24[E] *A* are the next two succeeding future symbols. Since the error signal on line 31 has been delayed two time units, multiplication of this error signal and the contents of center shift register stage 24C represents a correlation of the present data symbol and the present error signal. Averaging a succession of such products results in a good estimate of principal impulse response component $h_0$. Similarly it is evident that correlation of the contents of the other shift register stages with the error signal on line 31 will yield estimates of other impulse response components.

Accordingly, conventional multipliers 23A through 23E are provided at the outputs of the corresponding shift register stages 24A through 24E. The other multiplier inputs are connected in common to lead 31 bearing the error signal. Since the quantities stored in the shift register are merely polarity indicators, the multipliers can be inverting amplifiers taken in and out of the circuit according to the polarity of the contents of the shift register stage. Averaging of successive products is accomplished in low-pass filters 22A through 22E connected to the outputs of the corresponding multipliers 23A through 23E. The low-pass filters integrate successive inputs in a well-known manner.

A plurality of binary slicers 20A through 20E provide means for determining the polarity of the estimated impulse response components. The operation of these slicers in conjunction with up-down reversible counters associated with attenuators 15A through 15E is the same as described in the copending application.

The time over which the averaging of the products of the error signals and the data symbols is made is determined by counter 26 and gate 21. Counter 26 is driven by clock 25 and produces an output at some preset number of counts. Upon the appearance of the counter output, switches 21A through 21E, indicated symbolically in detached contact form as crosses, are operated in gate 21. The contents of low-pass filters 22 are thus connected periodically to slicers 20.

The adjustment of attenuator 15C at the reference tap 14C depends on a correlation of the present error and present data symbol. Therefore, the setting of this attenuator maintains the principal component $h_0$ of the impulse response uniform from symbol to symbol and renders valid the assmption earlier made that the output of subtractor 32 is the error signal containing only interference components of the channel impulse response.

On the other hand, the adjustments of the remaining attenuators 15 depend on correlations of the present error signal and past or future data symbols. Therefore, these attenuators automatically tend to reduce the individual intersymbol interference components at sampling intervals in the error signal to minimum values.

The time over which successive samples must be averaged and consequently the count preset in counter 26 is a complex function of the size of the incremental steps provided in attenuators 15 and the degree of distortion and noise in transmission channel 11. For transmission over the average voice telephone lines at a transmission rate of 2400 symbols per second it has been found that counter 26 should be set to count to about 20 for a five-tap equalizer as shown in the drawing. A longer delay line will provide lower residual distortion. A shorter averaging time produces wrong attenuator settings. A longer averaging time increases the settling time without any increase in accuracy. Settling time refers to the interval required to bring the equalizer from a reference condition to its optimum settings at which time all attenuators are in the random walk condition. Any change in the transmission channel characteristics with time after the initial equalization are automatically corrected.

The principle of this invention relating to the adaptive estimation of impulse response components from a normal message sequence has been described for a binary data signal sequence. It is, however, applicable as well to a multilevel data sequence. In the multilevel case provision is made for making impulse response component estimates for each slicing level. Slicer 18 becomes multilevel and furnishes quanitized samples of the analog output of the equalizer. A digital-to-analog converter is added between line 29 and subtractor 32 to facilitate the determination of the error signal. A shift register 24 is required for each slicing level. Similarly the remainder of multipliers 23, filters 22, switches in gate 21 and binary slicers are also increased in number.

[The spirit and scope of this invention is not intended to be limited to the particulars of the illustrative embodiment, but only by the following claims.]

What is claimed is:

1. Apparatus for adaptively and continuously adjusting the attenuators in a transversal equalizer connected to a distorting transmission channel comprising a digital data source applying signals to said channel means sampling at signaling intervals the output amplitude of said equalizer after said signals have traversed said channel and equalizer, means slicing the output of said equalizer to a standard amplitude at the correct polarity to represent each estimated data signal, means taking the difference between the outputs of said sampling and slicing means to obtain an overall distortion component, means multiplying the present distortion component by successive outputs of said slicing means, means separately integrating the successive products from said multiplying means over a plurality of data intervals, and means incrementally adjusting said attenuators in inverse relation to the polarity of the separate output of said integrating means.

2. The apparatus of claim 1 in which said multiplying means comprises a shift register having a plurality of stages for storing successive data signal estimates, means delaying the over-all distortion component from said sampling means to permit the correlation of a present output of said sampling means with past present and future outputs of said sampling means and a plurality of polarity inverters connected in common to said delaying means and individually to a stage of said shift register, the contents of the shift register stage determining whether the common input signal is effectively multiplied by plus or minus one.

3. The apparatus of claim 1 in which said integrating means are low-pass filters.

4. In combination with a transmission channel of limited bandwidth and a transversal filter having a plurally tapped delay line, an incrementally adjustable attenuator in series with each tap and a common summing point, means continuously establishing optimum settings for said attenuators adaptive to a random polar signal sequence traversing said channel at a synchronous rate comprising means taking synchronous samples of the analog signal at said summing point, means synchronously detecting the probable data symbol at said summing point, means subtracting the outputs of said detecting means from those of said sample-taking means to obtain error signals, means continuously storing a plurality of successive probable data symbols from said detecting means, means delaying by a fixed number of periods the samples from said sample-taking means to enable effective correlation of each error signal from said subtracting means with a plurality of successive data symbols, including symbols coincident with, and occurring before and after each said error signal, a plurality of product-taking means for multiplying each error sample by plus or minus one according to the polarity of the data symbol in said storing means, means averaging the outputs of said product-taking means to estimate the polarity of interference components at the several taps of said delay line, means periodically slicing the outputs of said averaging means in accordance with the polarity thereof, and means responsive to the polarities of the outputs of said slicing means for incrementally adjusting the attenuators in said transversal filter in opposition thereto.

5. An adaptive equalizer for a transmission channel of nited bandwidth comprising a polar binary data source supplying random pulse signals to one end of said channel at a fixed transmission rate, a transversal filter at the other end of said channel having at least a delay line portion with output taps at intervals compatible with said transmission rate, an incrementally adjustable attenuator connected to each such output tap and a summing circuit combining the attenuated outputs of all such taps, means obtaining samples of the analog output of said summing circuit at said fixed transmission rate, means reconstructing pulses at standardized amplitudes as quantized estimates of the polarity of samples of the analog output of said summing circuit, means subtracting said quantized estimates from said analog samples as interference error signals, means multiplying each individual error signal by a plurality of said quantized estimates including effective past, present and future estimates, means averaging a preselected plurality of corresponding successions of products from said multiplying means as estimates of individual components of the impulse response of said transmission channel, means detecting the polarity of averages from said averaging means at preselected multiples of said transmission rate, and means responsive to the detected polarities of said averages incrementally changing the settings of said attenuators.

6. Apparatus for adaptively establishing optimum settings for the attenuators in a transversal equalizer from a message data sequence traversing a distorting transmission channel in tandem with said equalizer comprising means repeatedly determining error signals as the difference between time-spaced analog samples and standardized estimates of the data sequence in message signals operated on by said equalizer, means repeatedly multiplying said error signals and a plurality of standardized estimates of the data sequence occurring with, before and after said error signals, means separately integrating repeated products from said multiplying means for the duration of a predetermined plurality of successive error signals to obtain estimates of individual time-spaced interference components of the impulse response of said transmission channel, and means responsive to periodic polarity samples of the estimates of interference components in said integrating means adjusting step-by-step said attenuators in a direction to reduce said interference components to substantially zero over a period of time.

References Cited

The following references, cited by the Examiner, are of record in the patented file of this patent or the original patent.

UNITED STATES PATENTS

| | | | |
|---|---|---|---|
| 2,908,873 | 10/1959 | Bogert | 333—18 |
| 2,908,874 | 10/1959 | Pierce | 333—18 |
| 3,011,135 | 11/1961 | Stump et al. | 333—18 |
| 3,071,739 | 1/1963 | Runyon | 333—18 |
| 3,292,110 | 12/1966 | Becker et al. | 333—18 |
| 3,305,798 | 2/1967 | Rappeport | 333—18 |
| 3,366,895 | 1/1968 | Lucky | 333—18 |
| 2,263,376 | 11/1941 | Blumlein | 333—70 X |

ELI LIEBERMAN, Primary Examiner

U.S. Cl. X.R.

333—28 R